3,337,294
PROCESS FOR RECOVERING SODIUM CARBONATE AND HYDROGEN SULFIDE FROM SPENT COOKING LIQUOR
Masao Ono, Hiroshima, and Tutomu Horiguchi, Nagasaki, Japan, assignors to Mitsubishi Shipbuilding & Engineering Co., Limited, Tokyo, Japan
No Drawing. Filed June 8, 1966, Ser. No. 555,959
Claims priority, application Japan, May 31, 1962, 37/22,135
4 Claims. (Cl. 23—63)

ABSTRACT OF THE DISCLOSURE

Spent cooking liquor containing sodium sulfite or sodium bisulfite is treated to recover sodium carbonate and hydrogen sulfide by incinerating the spent liquor to form a smelt, cooling the smelt to solidify it, subdividing the solidified smelt into particles, and contacting the particles with carbon dioxide and water vapor at room temperature to 100° C. to produce sodium carbonate particles and hydrogen sulfide gas.

This application is a continuation-in-part of application Ser. No. 283,556, filed May 27, 1963 and now abandoned.

This invention relates to a process of recovering chemicals, specifically, sodium and sulfur compounds, from the spent cooking liquor obtained from sodium base pulping processes, and more particularly to a process of converting a smelt consisting of sodium carbonate and sodium sulfide into sodium carbonate and hydrogen sulfide.

As is well known, there are presently used such processes as the kraft process, the neutral sulfite process, and the bisulfite process to manufacture sodium base pulps. A product prepared by burning a spent liquor from those processes in a recovery furnace contains essentially a mixture of sodium carbonate and sodium sulfide. Such a product may be referred to hereinafter as a "smelt."

Since a spent liquor obtained from the kraft process mainly consists of sodium sulfide and sodium hydroxide a smelt resulting from that spent liquor can readily be reclaimed merely by dissolving the smelt in water. The resultant aqueous solution is generally called a green liquor. However, it is not as easy to reclaim spent liquors obtained from the sulfite and bisulfite processes.

If either the sulfite or the bisulfite process is employed it is necessary to dissolve the smelt in water and to sulfite the green liquor to produce sodium sulfite or sodium bisulfite as the case may be. Because of the presence of sodium sulfide in the green liquor the direct sulfitation of the green liquor is very frequency accompanied by a secondary reaction whereby sodium thiosulfate and other polysulfides which detrimentally affect the cooking process are formed.

Generally, in order to avoid this detrimental effect, the green liquor has been fed into a carbonation tower for carbonating the green liquor in counterflow relationship with gaseous carbon dioxide before sulfitation. Such recovery processes consist of several complicated steps.

In such a carbonation tower in which a contact reaction between gas and liquid phases causes carbonation of the green liquor, the reaction has both a fairly low velocity and an extremely low efficiency. Thus the carbonation tower is disadvantageous in that the required height thereof is high, and that it is necessary that a gas of extremely pure carbon dioxide in a large amount be fed into the tower and so on.

Further, in any conventional carbonation tower for effecting a contact reaction between gas and liquid phases, sodium bicarbonate resulting from the carbonation is precipitated in the form of minute crystals because of its low solubility in water. This precipitation of sodium bicarbonate in the form of minute crystals may often clog the bottom of the tower. Therefore, the tower must frequently be cleaned. Alternatively, it should be washed with steam to re-dissolve the precipitate. This results in extreme complication of the operation. In some cases, the precipitation of sodium bicarbonate makes necessary the interruption of the carbonation reaction. This makes it necessary to provide at least one spare carbonation tower, resulting in an undersirable increase in the costs of equipment and operation.

On the other hand, hydrogen sulfide evolved during the aforesaid carbonation may be mixed and fired with sulfur for the purpose of producing gaseous sulfur dioxide necessary for sulfitation carried out in the subsequent step. Since the green liquor is highly alkaline a large amount of hydrogen sulfide evolved is dissolved in the same thereby decreasing fairly substantially the recovery of hydrogen sulfide. This leads to an increase in sulfur loss. In order to compensate for this sulfur loss, the amount of sulfur feed may be increased, but this results in an immediate increase in the cost of raw materials. Alternatively, the hydrogen sulfide dissolved in the carbonated solution may be stripped off by heating with steam. The latter procedure further increases the complication of the recovery process.

In addition, hydrogen sulfide released from the carbonation tower through its top is very diluted because it contains an excess of carbon dioxide which has not been reacted. This concentration of discharged hydrogen sulfide may be difficult to burn.

Accordingly, it is a general object of the invention to eliminate these and other disadvantages of and objections to the prior art practices.

It is another object of the invention to provide an improved process of reclaiming spent liquor regardless of the type of cooking processes.

It is a further object of the invention to provide an improved process of inexpensively reclaiming spent liquor by using a small-sized carbonator.

It is a still further object of the invention to provide an improved process of reclaiming spent liquor even with a relatively small amount of a gas containing a low concentration of gaseous carbon dioxide within an extremely short time and with a high yield.

With the aforesaid objects in view, the invention resides in a process of treating a spent cooking liquor containing sodium sulfite or sodium bisulfite comprising the steps of concentrating and burning the spent liquor to form a smelt containing sodium sulfide, cooling the smelt to solidify it, subdividing the solidified smelt into particles or grains, and contacting the particles with a gaseous mixture containing carbon dioxide and water vapor to convert sodium sulfide contained in the smelt into sodium carbonate. At no stage in this process is the smelt dissolved. The expression "spent cooking liquor" refers in particular to the spent liquor which is obtained from the digestion of a lignocellulosic plant material with a cooking liquor mainly consisting of aqueous sodium sulfite or sodium bisulfite.

The invention is based upon the discovery that a solid-with-gas phase reaction effected between the smelt in solid state and the gaseous mixture containing carbon dioxide and water vapor has both a velocity of reaction for higher than that previously expected and a high efficiency of reaction. Thus, according to the features of the invention, a smelt obtained by burning a spent liquor is cooled to be solidified and the solidified smelt is reacted directly with the gaseous mixture of carbon dioxide and water vapor to be carbonated. It is to be noted that the smelt is never dissolved in water. In this respect, the invention is significantly different from any conventional process comprising the steps of first dissolving the smelt in water, to obtain so called green liquor, and then reacting the green liquor with gaseous carbon dioxide to effect carbonation.

In practicing the invention a spent liquor is first burned in a recovery furnace to form a smelt. Coincident to and inherent in the burning of the spent liquor is an initial concentrating of the spent liquor due to the evaporation of water therefrom caused by the heat. The smelt thus produced is removed from the furnace and allowed to be cooled. Alternatively, the smelt which is removed from the furnace may be forcedly cooled with water or indirectly with a gas, or directly with an inert gas. Since the smelt has a very high magnitude of enthalpy, the heat content of the smelt may be utilized to preheat a feed water or a combustion air feed adapted to be used in the recovery furnace with the result that the thermal economy is improved.

In order to increase the surface area of the smelt in contact with gaseous mixture of carbon dioxide and water vapor for the purpose of accelerating the reaction effected between the smelt in the solid state and the gaseous mixture of carbon dioxide and water vapor, the smelt after having been cooled is preferably crushed or flaked into small pieces having an average dimension as small as possible but not so small as to prevent gaseous carbon dioxide from freely passing through the mass of crushed or flaked smelt. For example, the pieces of the smelt may advantageously have an average grain diameter not exceeding several millimeters. The smelt is preferably crushed or flaked to an average grain size of about from 50 to 100 mesh and most preferably about 100 mesh.

Upon cooling and crushing the smelt, a gas containing gaseous carbon dioxide may be advantageously supplied to a crusher where the smelt is to be crushed, whereby cooling, crushing and carbonating of the smelt can be simultaneously performed. In addition, the gas heated in and leaving the crusher may be put in heat transfer relationship with combustion air adapted to be used in the recovery furnace.

If it is desired only to cool and crush the smelt, then steam, nitrogen or air may be introduced into the cooler or the crusher. However, it is noted that, if air is directly blasted upon a hot smelt having a temperature of 500° C. or more there may be a danger that sodium sulfide contained in the same will be partially oxidized to be converted into sodium sulfate.

It has been found that the smelt in solid state is satisfactorily reacted with a gaseous mixture of carbon dioxide and water vapor at a temperature ranging from room temperature to any higher temperature at which the smelt is maintained in solid state, said higher temperature being less than the temperature of the smelt when leaving the exit of the recovery furnace or below from 800° to 860° C. However, taking into acccount the fact that the smelt is crushed into the proper grain size in order to increase the surface area of the same in contact with gaseous carbon dioxide to thereby accelerate reaction therebetween, and that cooling of the smelt is desirable for facilitation of its crushing, a temperature at which the smelt in solid state is reacted with gaseous carbon dioxide is preferably selected to range from room temperature to approximately 600° C. The most preferred range, for the greatest efficiency of the carbonation reaction, is found to be about from 80 to 300° C.

Also, gaseous carbon dioxide used with the invention is not necessarily required to be pure and even any impure gas containing a small content of carbon dioxide and some percentage of oxygen may advantageously be employed. However, in order to assure a more rapid and efficient carbonation reaction, it is preferred that the gaseous mixture contain at least about 10% by volume of carbon dioxide. Also, in order to avoid undue formation of sodium sulfate and polysulfides, thus lowering the reaction efficiency, it is preferred that the gaseous mixture contain no more than about 10% by volume of oxygen. This permits the utilization of a waste gas resulting from the sulfitation step following the carbonation step with a satisfactory result. Alternatively, if the kraft process is utilized, it is possible to use a flue gas discharged by a furnace for roasting lime to produce slaked lime which, in turn, may be used in the step of causticizing the green liquor.

The amount of gaseous carbon dioxide and water vapor supplied depend upon the content of sodium sulfide in the smelt. It has been found that the number of moles each of gaseous carbon dioxide and water vapor is required only to be equal to or more than the number of moles of sodium sulfide contained in the smelt. It is, however, undesirable to use a number of moles of water vapor exceeding about four times the number of moles of sodium sulfide contained in the smelt because otherwise the smelt particles may coagulate with each other. Also, for maximum efficiency, it is preferred that the number of moles of carbon dioxide be more than 1.5 times the number of moles of sodium sulfide contained in the smelt.

If the smelt as produced is left exposed to the atmosphere then the same tends to absorb a considerable amount of moisture because of its deliquescent and hygroscopic properties. The smelt will thereby contain a suitable percentage of water and a wet carbon dioxide containing gas is not necessarily used and a dry carbon dioxide containing gas can be employed to effect satisfactory carbonation. Due to the vapor pressure of water, water vapor will be present and intermix with the carbon dioxide. In case a flue gas from a recovery furnace is used as a source of gaseous carbon dioxide additional water vapor or moisture is not required to be supplied to the smelt because the flue gas already contains a great amount of moisture. Inherently, the moisture will be vaporized into water vapor and intermix with the carbon dioxide during the reaction step.

According to the present process gaseous carbon dioxide is adapted to react directly upon the smelt as previously described. This effectively prevents hydrogen sulfide evolved during the carbonation reaction from being dissolved into an aqueous solution such as when a green liquor is carbonated according to the prior art practice. This results in great decrease in loss of sulfur.

If hydrogen sulfide evolved upon carbonating the smelt is able to be burned in its intact condition the same can be burned in that condition to produce gaseous sulfur dioxide which, in turn, will be utilized as a source of gaseous sulfur dioxide, in the succeeding sulfitation step. On the contrary, if the hydrogen sulfide is burned with difficulty in its intact condition due to an excess of carbon dioxide contained in the same or for any other reason then such hydrogen sulfide may be first either separated from the carbon dioxide or concentrated according to any suitable technique and then burned to produce sulfur dioxide for the sulfitation step.

In practicing the process of the invention either batch or continuous types of carbonation devices can be used. After the smelt has been cooled and crushed into any appropriate grain size in any suitable manner the crushed smelt can be loaded in a carbonator which may be of a rotary furnace type, a multiple plate type, a fluidized bed type, a transporting bed type, a fixed bed type or the like. Alternatively, as previously described, any suitable crusher for crushing solidified smelt may be equally used as a carbonation device with a gaseous mixture of carbon dioxide and water vapor being supplied to the same. The following examples illustrate the practice of the invention. As previously explained, a smelt produced by burning any spent liquor comprises essentially sodium carbonate and sodium sulfide. In preliminary experiments, dehydrated sodium sulfide and dehydrated sodium carbonate were each crushed into an average grain size of 100 mesh and intimately admixed in equimolar amounts. The resulting mixture was charged to a ceramic experimental apparatus. Then the apparatus was placed in an electric tubular furnace maintained at a temperature of 100° C. while water vapor containing from 3 to 5% by volume of gaseous carbon dioxide and pre-heated to from 60° to 80° C. was supplied to the electric furnace through one end. In this way, the carbonation reaction was effected for approximately 3 minutes until an excess of gaseous carbon dioxide reached the order of 50%. As a result, from 90 to 95% of the sodium sulfide was converted into sodium carbonatae. Dependent upon the particular conditions for carbonation, from 5 to 10% of sodium sulfide could be converted into sodium bicarbonate. In any event, sodium sulfide was converted, at an extremely high rate of carbonation, into sodium carbonate or bicarbonate, which is most suitable for reclaiming the spent liquor.

Then experiments were conducted with a smelt actually produced by burning a spent liquor. That smelt contained approximately 20% by weight of sodium sulfide. The smelt was cooled and crushed into an average grain size of from 50 to 100 mesh. Samples of a constant amount taken from the crushed smelt were loaded one at a time in a rotary apparatus of cylindrical shape and proportions of sodium sulfide converted into sodium carbonate were determined in varying the amounts of gaseous carbon dioxide and water supplied to the apparatus through one end.

In the experiments, pure carbon dioxide was used and different numbers of moles of the carbon dioxide in the range of from 1.0 to 2.5 times the number of moles of sodium sulfide contained in the smelt were used in each carbonation reaction while the number of moles of water vapor was always kept at a relatively constant value, within the range of from 1.0 to 1.5 times the number of moles of the sodium sulfide, for the carbonations. Each carbonation reaction was carried out for approximately three minutes. The results obtained are listed in the following Table I illustrating the relationship between the percentage of sodium sulfide converted into sodium carbonate and an amount of gaseous carbon dioxide and a treating temperature.

TABLE I.—PERCENTAGE OF SODIUM SULFIDE CONVERTED INTO SODIUM CARBONATE

| Treating Temperature: | Molar Ratio of $CO_2$ to $Na_2S$ | | | |
|---|---|---|---|---|
| | 1:1 | 1.5:1 | 2:1 | 2.5:1 |
| 30° C | | | 60-80 | 70-85 |
| 80° C | | | 80-90 | 85-95 |
| 100° C | 60-70 | 70-85 | 85-95 | 90-95 |
| 150° C | 60-70 | 70-85 | 80-90 | 85-95 |
| 300° C | | | 70-80 | 80-90 | 80-95 |
| 500° C | | | 70-80 | 80-85 | 80-90 |
| 600° C | | | 65-75 | 80-85 | 80-85 |

It is clearly shown in Table I that numbers of moles of carbon dioxide more than 1.5 times the number of moles of the sodium sulfide contained in the smelt and temperatures from 80° C. to 300° C. are the most suitable for the carbonation reaction of the smelt.

Another series of samples taken from the same smelt was treated with impure carbon dioxide gas at 100° C. in a manner similar to that just described. With such a gas including, by volume, more than 50% of carbon dioxide, 5% of oxygen and the balance nitrogen, more than 90% by weight of sodium sulfide was converted into sodium carbonate within only several minutes as in the case of using pure carbon dioxide gas, provided that gaseous carbon dioxide and water vapor were used in amounts exceeding twice the number of moles of sodium sulfide contained in the smelt.

The use of a treating gas including by volume from 15 to 30% of carbon dioxide, 5% of oxygen and the balance nitrogen reduces somewhat the velocity of reaction. Results of experiments, however, indicated that, if the treating time and the amount of gaseous carbon dioxide used are equal to, or more than, twice those required for using pure carbon dioxide gas that more than 80% by weight of sodium sulfide can be converted into sodium carbonate. From this it is to be appreciated that a flue gas from recovery furnaces can be satisfactorily utilized for the purpose of treating the smelt because such gas contains approximately 15% by volume of carbon dioxide. Of course, any impure carbon dioxide gas such as a flue gas may be used to effect preliminary carbonation and then pure carbon dioxide gas used to effect complete carbonation with satisfactory results.

Blasting of air upon a hot smelt maintained at more than 500° C. may cause partial oxidation of sodium sulfide contained in the same. In order to determine the effect of air upon a smelt at elevated temperature, a 0.5 g. sample taken from a smelt resulting from the kraft process was heated at a rate of 10° C./min. while the same was weighed by a thermobalance. The sample exhibited an incremental weight increase due to its oxidation as listed in the following Table II.

TABLE II.—OXIDATION INCREMENT OF KRAFT PROCESS SMELT VERSUS TEMPERATURE

| | Temperature in ° C. | | | | | |
|---|---|---|---|---|---|---|
| | 100 | 200 | 300 | 400 | 500 | 600 |
| Oxidation increment in mg | 1.0 | 2.5 | 4.5 | 8.0 | 10.0 | 30.0 |

From Table II it can be presumed that, if a treating gas used contains oxygen there may be a fear of producing sodium thiosulfate, other polysulfides and sodium sulfate. However, it was found by experiments that, if a treating gas including admixed therewith from 5 to 10% by volume of oxygen is used at a treating temperature up to 500° C. the formation of sodium sulfate and polysulfides was negligible. This means that a treating gas including admixed therewith up to 10% by volume of oxygen does not have the detrimental effect. However, if a treating gas including admixed therewith from 5 to 10% by volume of oxygen is used at a temperature of from 500° to 600° C. then about 5% by weight of sodium sulfide contained in a smelt being treated will be oxidized. Thus if the carbonation treatment is desired to be carried out at a temperature of from 500° to 600° C. or more a tretating gas must be chosen to include oxygen in a minimum amount. Preferably, pure carbon dioxide gas may be used, if possible.

As is well known, smelts may include various proportions of sodium sulfide dependent upon the type of cooking liquors and cooking processes. Two types of smelts containing approximately 50 and 70% by weight of sodium sulfide respectively were subjected to carbonation treatment in a manner similar to that previously described in conjunction with Table I and the results obtained are listed in the following Table III.

TABLE III.—PERCENTAGE OF SODIUM SULFIDE IN SMELT CONVERTED INTO SODIUM CARBONATE

| | Content of Sodium Sulfide in percent by weight | | | | | |
|---|---|---|---|---|---|---|
| | 50% | | | 70% | | |
| | Molar ratio of $CO_2$ to $Na_2S$ | | | | | |
| | 1:1 | 2:1 | 2.5:1 | 1:1 | 2:1 | 2.5:1 |
| Treating Temperature: | | | | | | |
| 30° C | 70-90 | 90-95 | 90-95 | | | |
| 100° C | 80-90 | 90-95 | 90-95 | 70-80 | 92-96 | 92-96 |
| 150° C | | 90-95 | 90-95 | 70-80 | 90-95 | 92-96 |
| 300° C | | 85-95 | 85-95 | | 85-95 | 90-95 |
| 500° C | | 80-90 | 85-95 | | 80-90 | 85-90 |
| 600° C | | 80-90 | 80-90 | | 80-90 | 80-90 |

The results listed in Table III indicate clearly that, even with a high content of sodium sulfide, the same can be simply converted into sodium carbonate.

The smaller the grain size of a smelt to be treated the more effectively the carbonation treatment will be carried out. However, the results of experiments indicated that, even if a crushed smelt would include admixed therewith grains whose diameters are approximately several millimeters that more than 80% by weight of sodium sulfide can be converted into sodium carbonate under the same conditions as those previously described. Table IV obtained with a smelt having the grain diameters ranging from 1 to 5 millimeters and including 20% by weight of sodium sulfide.

TABLE IV.—PERCENTAGE OF SODIUM SULFIDE IN SMELT CONVERTED INTO SODIUM CARBONATE

| | Molar ratios of $CO_2$ to $Na_2S$ | |
|---|---|---|
| | 2:1 | 3:1 |
| Temperature: | | |
| 100° C | 80-85 | 80-90 |
| 150° C | 70-80 | 80-85 |

Dependent upon the conditions for carbonation sodium bicarbonate may be produced in addition to sodium carbonate. The proportion of sodium bicarbonate produced may be varied over a relatively wide range in accordance with the treating temperature. If the carbonation operation is performed at room temperature sodium bicarbonate will be produced in an amount corresponding to approximately 5% by weight of sodium sulfide whereas the carbonation effected at a temperature of from 80° to 100° C. or more will result in the production of the same in a negligible amount.

The carbonation reaction according to the invention is exothermic and sodium sulfide generates approximately 34 Kcal per each mol. If a treating temperature will be below approximately 300° C. then only an amount of heat generated by sodium sulfide per se can well maintain such a temperature for the carbonation reaction. It is to be understood that the heat due to the reaction of sodium sulfide with gaseous carbon dioxide and water vapor may be utilized to preliminarily heat feed air to a recovery furnace and/or a feed gas to a carbonator.

While the invention has been described in terms of carbonation under atmospheric pressure it is to be understood that the invention is advantageously applicable to a carbonation treatment effected under a pressure of several atmospheres with both gaseous carbon dioxide and superheated water vapor supplied. Also a portion of a gas leaving a carbonator may be recirculated through the same and thereby an excess of carbon dioxide can be advantageously utilized.

The invention has several advantages. For example, the present process can subject a smelt from a recovery furnace to carbonation treatment in a very simple, cheap manner as compared with any of the conventional processes. It permits a small-sized carbonator to be used. Further the process of the invention can convert sodium sulfide in the smelt into sodium carbonate both in a short time and with a good yield, and without any secondary product formed. Therefore, an extremely pure chemical for making sodium sulfite or sodium bisulfite can be obtained. In addition, a gas including a low content of gaseous carbon dioxide such as a flue gas from a furnace for burning a spent liquor can be used as a source of carbon dioxide.

The invention is not to be construed as limited to the particular forms disclosed herein, since these are to be regarded as illustrative rather than restrictive.

What we claim and desire to secure by Letters Patent is:

1. A process of converting a spent cooking liquor containing a compound selected from the group consisting of sodium sulfite and sodium bisulfite into sodium carbonate and hydrogen sulfide comprising: concentrating and burning the spent cooking liquor to form a smelt containing sodium sulfide; cooling the smelt to solidify it; subdividing the solidified smelt into particles of an average size of about from 50 to 100 mesh; and contacting the particles with a gaseous mixture comprising carbon dioxide and water vapor at a temperature of from room temperature to 100° C., the molar proportion of the carbon dioxide to the sodium sulfide in the smelt being at least about one and the molar proportion of the water vapor to the sodium sulfide in the smelt being about from 1 to 4, to produce sodium carbonate and hydrogen sulfide.

2. A process according to claim 1 in which the molar proportion of the carbon dioxide to the sodium sulfide in the smelt is in excess of 1.5.

3. A process of converting into sodium carbonate and hydrogen sulfide the spent liquor obtained from the digestion of a lignocellulosic plant material with a cooking liquor mainly consisting of an aqueous solution of a compound selected from the group consisting of sodium sulfite and sodium bisulfite comprising: burning the spent liquor to form a smelt containing sodium sulfide; cooling the smelt to solidify it; subdividing the solidified smelt into particles of an average size of about from 50 to 100 mesh; and contacting the particles with a gaseous mixture comprising carbon dioxide and water vapor at a temperature of from room temperature to 100° C., the molar proportion of the carbon dioxide to the sodium sulfide in the smelt being at least about one and the molar proportion of the water vapor to the sodium sulfide in the smelt being about from 1 to 4, to produce sodium carbonate and hydrogen sulfide.

4. A process according to claim 3, in which the molar proportion of the carbon dioxide to the sodium sulfide in the smelt is in excess of 1.5.

References Cited

UNITED STATES PATENTS 951,243   3/1910   Hasenbach _____ 23—63
3,111,377 11/1963  Mugg _____ 23—48

OTHER REFERENCES

Merck Index, Seventh Edition, Merck & Co., N.J., 1960, page 946 relied on.

OSCAR R. VERTIZ, *Primary Examiner.*

G. T. OZAKI, *Assistant Examiner.*